US009519948B2

(12) United States Patent
Matsumoto (10) Patent No.: US 9,519,948 B2
(45) Date of Patent: Dec. 13, 2016

(54) DATA PROCESSING APPARATUS, DATA PROCESSING METHOD, AND NON-TRANSITORY COMPUTER READABLE MEDIUM (71) Applicant: FUJI XEROX CO., LTD., Tokyo (JP)

(72) Inventor: Daisuke Matsumoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 65 days.

(21) Appl. No.: 14/598,359

(22) Filed: Jan. 16, 2015

(65) Prior Publication Data

US 2016/0048971 A1    Feb. 18, 2016

(30) Foreign Application Priority Data

Aug. 14, 2014  (JP) ................. 2014-165063

(51) Int. Cl.
G06K 9/00    (2006.01)
G06T 1/60    (2006.01)
G06T 9/00    (2006.01)
G06T 1/20    (2006.01)

(52) U.S. Cl.
CPC . G06T 1/60 (2013.01); G06T 1/20 (2013.01); G06T 9/004 (2013.01)

(58) Field of Classification Search
USPC ....................................... 382/173
See application file for complete search history.

(56) References Cited

U.S. PATENT DOCUMENTS 8,824,804 B2    9/2014 Tamatani et al.
2009/0219444 A1    9/2009 Notsu et al.
2014/0093180 A1*   4/2014 Esenlik ................. H04N 19/70
                                                382/233

FOREIGN PATENT DOCUMENTS

JP    H05-143720 A    6/1993
JP    2008-040614 A   2/2008
JP    2012-231230 A   11/2012

* cited by examiner

Primary Examiner — Yon Couso
(74) Attorney, Agent, or Firm — Oliff PLC (57) ABSTRACT A data processing apparatus includes an analyzer and a controller. The analyzer analyzes data in plural regions of target data to thereby determine, for each region, a block size to be applied as a unit of processing of data in the region. The controller configures, for each region, a circuit corresponding to the block size to be applied to the region, in a reconfigurable circuit in a case of processing the data in the plural regions of the target data.

8 Claims, 9 Drawing Sheets

DATA PROCESSING APPARATUS, DATA PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-165063 filed Aug. 14, 2014.

BACKGROUND (i) Technical Field

The present invention relates to a data processing apparatus, a data processing method, and a non-transitory computer readable medium.

(ii) Related Art

As data processing apparatuses that process data in target data, image processing apparatuses that perform an image process, such as a color conversion process or a filter process, on image data have been available, and some techniques relating to the image process have been proposed.

SUMMARY

According to an aspect of the invention, there is provided a data processing apparatus including an analyzer and a controller. The analyzer analyzes data in plural regions of target data to thereby determine, for each region, a block size to be applied as a unit of processing of data in the region. The controller configures, for each region, a circuit corresponding to the block size to be applied to the region, in a reconfigurable circuit in a case of processing the data in the plural regions of the target data.

BRIEF DESCRIPTION OF THE DRAWINGS

Exemplary embodiments of the present invention will be described in detail based on the following figures, wherein.

DETAILED DESCRIPTION

Figure 1:
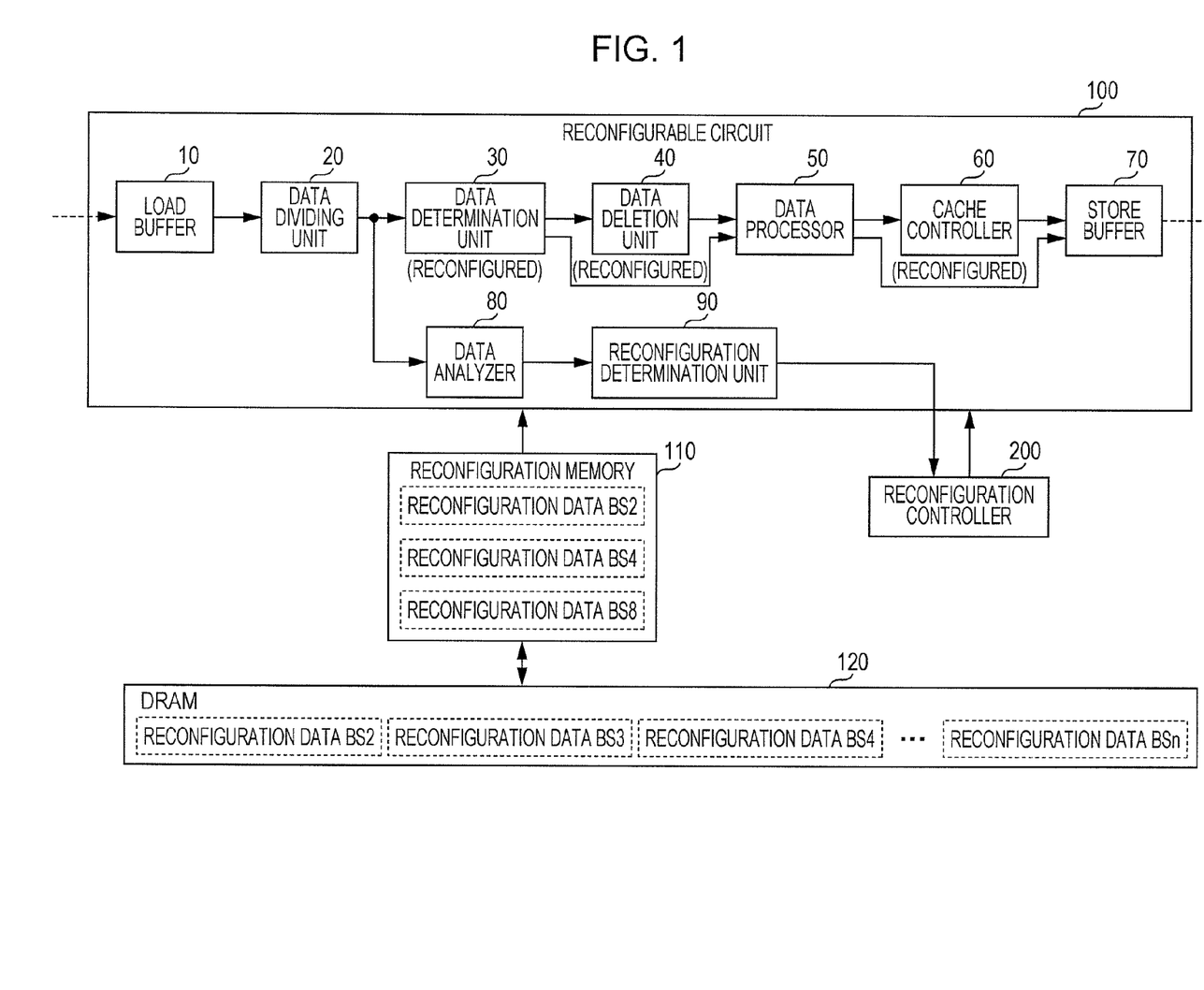
FIG. 1 is a diagram illustrating a specific example of a data processing apparatus in exemplary embodiments of the present invention.

FIG. 1 is a diagram illustrating a specific example of a data processing apparatus in exemplary embodiments of the present invention. A data processing apparatus in FIG. 1 includes a reconfigurable circuit 100, a reconfiguration memory 110, a dynamic random access memory (DRAM) 120, and a reconfiguration controller 200, and performs a data process on data that is to be a target. It is possible to implement the data processing apparatus in FIG. 1 by using a dynamic reconfigurable processor (DRP), for example. Note that the data processing apparatus in FIG. 1 is not limited to a DRP, and may be implemented by using other devices that are able to reconfigure a circuit.

The reconfigurable circuit 100 is a circuit that is able to reconfigure its internal logic circuit configuration dynamically, that is, while the reconfigurable circuit 100 is operating, and includes many circuit elements (processor elements (PEs)), for example. The connections between the circuit elements are reconfigurable (are able to be reorganized) at a relatively high speed in accordance with reconfiguration data. Units in the reconfigurable circuit 100 illustrated in FIG. 1 are implemented in accordance with the reconfigured circuit configuration.

The circuit configuration inside the reconfigurable circuit 100 is reconfigured on the basis of reconfiguration data stored in the reconfiguration memory 110. In the reconfiguration memory 110, it is possible to store one or more pieces of reconfiguration data corresponding to one or more circuit configurations. In the specific example illustrated in FIG. 1, reconfiguration data BS2, reconfiguration data BS4, and reconfiguration data BS8 are stored in the reconfiguration memory 110.

Many pieces of reconfiguration data used in the data processing apparatus in FIG. 1 are stored in the DRAM 120, and a piece of reconfiguration data stored in the DRAM 120 is loaded into (transferred to) the reconfiguration memory 110 as needed and is used in circuit reconfiguration inside the reconfigurable circuit 100. In the specific example illustrated in FIG. 1, many pieces of reconfiguration data BSn (n is a natural number) are stored in the DRAM 120.

The reconfiguration controller 200 controls a process relating to reconfiguration inside the data processing apparatus in FIG. 1. The reconfiguration controller 200 is composed of hardware that implements a calculation function and the like, for example, and software (control program, for example) that defines the operations of the hardware, and is implemented by cooperation between the hardware and the software. The function of the reconfiguration controller 200 may be implemented within a DRP or by a computer or the like, for example.

In a case where the function of the reconfiguration controller 200 is implemented by a computer, a program (control program) corresponding to the control function of the reconfiguration controller 200, which will be described in detail below, is stored in a computer-readable storage medium, such as a disk or a memory, and is provided to the computer from the storage medium. As a matter of course, the program may be provided to the computer via a telecommunication line, such as the Internet. By cooperation between the program (software) that has been provided and hardware resources, such as a central processing unit (CPU), a memory, and the like, included in the computer, the function of the reconfiguration controller 200 is implemented.

In addition to the function of the reconfiguration controller 200, some of the functions implemented in the reconfigurable circuit 100, such as the function of a data analyzer 80, for example, may be implemented by a computer or the like.

Data processed by the data processing apparatus in FIG. 1 is specifically image data, for example. Image data is provided to the data processing apparatus in FIG. 1 from an external apparatus, such as a computer, and the image data is input to a load buffer 10 in the reconfigurable circuit 100 via a data bus or the like, which is not illustrated, for example. The data processing apparatus in FIG. 1 may be integrated into an image processing apparatus having an image reading function (scan function) or the like, and image data obtained from a medium, such as paper, by using the function may be input to the load buffer 10. Alternatively, image data obtained after a process performed by the data processing apparatus in FIG. 1 may be output from a store buffer 70 and an image corresponding to the image data after the process may be printed on paper or the like, or the image data after the process may be provided to an external apparatus. As described above, an image processing apparatus may be implemented by the data processing apparatus in FIG. 1.

Note that image data is merely a specific example on which a process is able to be performed by the data processing apparatus in FIG. 1, and data other than image data may be processed by the data processing apparatus in FIG. 1. For example, the data processing apparatus in FIG. 1 may be mounted on an information processing apparatus, an information processing terminal, an audio-visual device or another consumer electrical appliance, a vehicle, or the like, and may be used in various data processes, control, and the like.

In the reconfigurable circuit 100, a circuit configuration for processing data (target data) that is to be processed is implemented. For example, a circuit configuration for performing a cache process on target data is implemented.

Figure 2A:
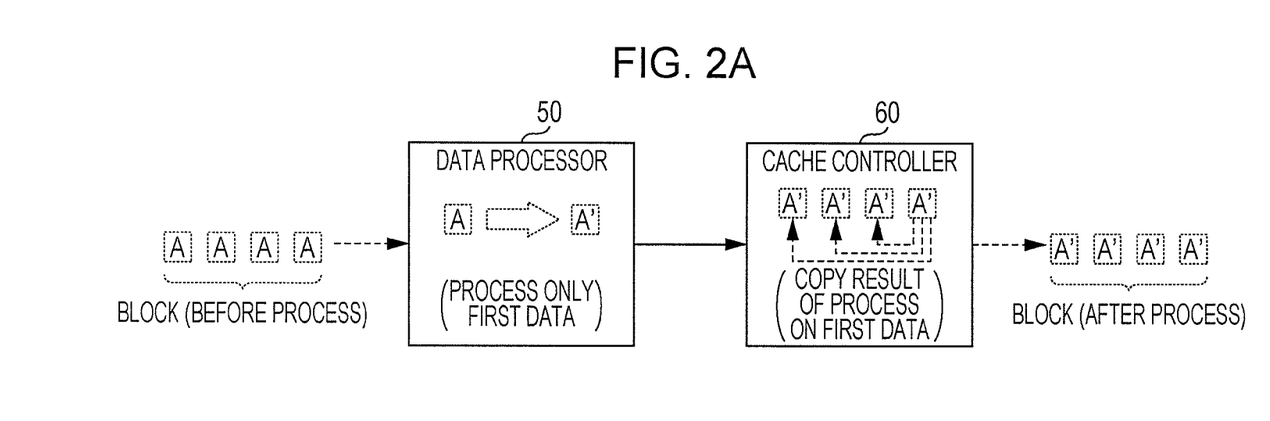
FIGS. 2A and 2B are diagrams for describing a cache process performed on target data.
Figure 2B:
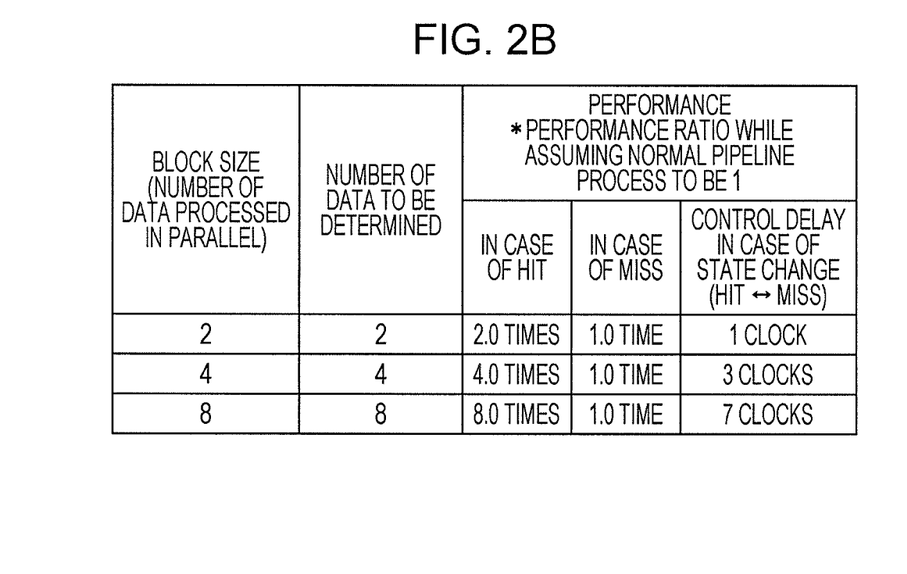

FIGS. 2A and 2B are diagrams for describing a cache process performed on target data, and FIG. 2A illustrates a specific example of the cache process. That is, a cache image process on image data performed by a data processor 50 and a cache controller 60 that are included in the reconfigurable circuit 100 in FIG. 1 is illustrated.

In the specific example in FIG. 2A, plural pieces of pixel data that constitute image data that is to be processed are put together into a block, which is formed of some pieces of pixel data. For example, four pieces of pixel data A are put together into a block, as illustrated in FIG. 2A.

The data processor 50 performs a data process on image data, that is, performs an image process. In the image process, in a case where it is possible to obtain, on the basis of the result of the process on one piece of pixel data in the block, the results of the process on all remaining pieces of pixel data, that is, in a case of a hit, the data processor 50 only performs the process on one piece of pixel data in the block and omits the process on the remaining pieces of pixel data.

For example, in a case where all pieces of pixel data in the block are the same, that is, in a case where all four pieces of pixel data in the block are the same pixel data A as in the specific example illustrated in FIG. 2A, the data processor 50 performs the image process on the first piece of pixel data A in the block, obtains pixel data A', which is the result of the process, and omits the process on the remaining pieces of pixel data A.

In a case where the image process is omitted by the data processor 50, that is, in the case of a hit, the cache controller 60 obtains the results of the process on the remaining pieces of pixel data on the basis of the result of the process on one piece of pixel data in the block. For example, as in the specific example illustrated in FIG. 2A, the cache controller 60 copies the pixel data A', which is the result of the process on the first piece of pixel data A in the block, and uses the copy as the results of the process on the remaining pieces of pixel data A.

Accordingly, as in the specific example illustrated in FIG. 2A, a block formed of four pieces of pixel data A' is obtained as a result of the image process performed on the block formed of four pieces of pixel data A.

On the other hand, in a case where it is not possible to obtain, on the basis of the result of the process on one piece of pixel data in the block, the results of the process on all remaining pieces of pixel data, that is, in a case of a miss, the data processor 50 performs the process on every piece of pixel data in the block and obtains the result of the process for each piece of pixel data.

In this way, plural pieces of pixel data in the image data are put together into a block one after another, and the cache process illustrated in FIG. 2A is performed for each block.

FIG. 2B illustrates a specific example of the performance of the cache process. The performance of the cache process depends on the number of pieces of data in a block, namely, the block size, which is the number of pixels that constitute one block. FIG. 2B illustrates the performance of the cache process in a case of the block size of "2", "4", and "8".

In the specific example illustrated in FIG. 2B, the block size "2" represents a case where two pieces of pixel data are put together into one block, the block size "4" represents a case where four pieces of pixel data are put together into one block, and the block size "8" represents a case where eight pieces of pixel data are put together into one block.

The number of pieces of data to be determined is the number of pieces of data needed to determine whether each block is in a hit state or in a miss state. For example, in the case of the block size "2", if two pieces of pixel data that constitute each block are the same, the block is a hit, and if the two pieces of pixel data are different from each other, the block is a miss. In the case of the block size "4", if all four pieces of pixel data that constitute each block are the same, the block is a hit. Otherwise, the block is a miss. Similarly, in the case of the block size "8", if all eight pieces of pixel data that constitute each block are the same, the block is a hit. Otherwise, the block is a miss.

FIG. 2B illustrates performance ratios while assuming a normal pipeline process to be a reference, as the performance of the cache process. In a normal pipeline process, the cache process on a block-by-block basis is not performed, and an image process is performed for each piece of pixel data among plural pieces of pixel data one after another.

In FIG. 2B, in the column "in case of hit", performance ratios in the case of the hit state are listed, and in the column "in case of miss", performance ratios in the case of the miss state are listed. For example, in the case of the block size "2" and in the case of a hit, it is sufficient to perform the image process only on one of the two pieces of pixel data, and therefore, the performance increases to a value 2.0 times the value of a normal pipeline process where both two pieces of pixel data are processed (for example, the processing time is cut in half). In the case of the block size "4" or "8" and in the case of a hit, the performance increases to a value 4.0 times or 8.0 times the value of a normal pipeline process, respectively.

In the case of a miss, the image process is performed on each piece of pixel data among plural pieces of pixel data in the block one after another, and therefore, the performance increase ratio is 1.0 regardless of the block size. That is, the performance is the same as a normal pipeline process.

In FIG. 2B, control delays (the number of clocks) in a case of a state change are listed. For example, in a case of processing plural blocks in image data having the block size "2" one after another, when the block state changes from the hit state to the miss state or from the miss state to the hit state, a control delay of one clock occurs. Note that, in the case of the block size of "4" or "8", a control delay in the case of a state change is three clocks or seven clocks, respectively. The control delay is caused by a feedback delay because a circuit for state change control is formed of a feedback circuit. However, the control delay occurs in a case of the cache process, for example, and does not necessarily occur.

In general, the performance in the case of a hit increases as the block size becomes larger. However, the probability of a hit decrease as the block size becomes larger. The probability of a hit also depends on the state of data in target data. For example, in a case where neighboring pieces of pixel data among plural pieces of pixel data that constitute image data have a high similarity, the probability of a hit increases even for a relatively large block size. On the other hand, in a case where neighboring pieces of pixel data have a low similarity, it is not possible to increase the probability of a hit unless the block size is made relatively small.

Accordingly, in the data processing apparatus in FIG. 1, target data is divided into plural regions and a data analysis is performed for each region to thereby determine a block size to be applied to a cache process on data in the region.

Referring back to FIG. 1, division and analysis of target data and a cache process are implemented by the units included in the reconfigurable circuit 100. Now, the functions of the units included in the reconfigurable circuit 100 and processes performed by the units will be described. Note that, a specific example will be described below in which image data is to be processed as target data.

Image data to be processed is temporarily stored in the load buffer 10 and thereafter sent to a data dividing unit 20. The data dividing unit 20 divides the image data into plural image regions. The image data is constituted by plural pieces of pixel data that are arranged in the longitudinal and lateral directions, for example. That is, each line is constituted by plural pieces of pixel data arranged in a row in the lateral direction, and plural lines are arranged in the longitudinal direction to thereby constitute image data. The data dividing unit 20 assumes one line to be one image region, and divides the image data into plural lines.

A data determination unit 30, a data deletion unit 40, the data processor 50, and the cache controller 60 perform a data process (for example, the cache process described with reference to FIGS. 2A and 2B) on the image data. On the image data that has been divided into plural lines, the data process is performed for each line, and image data obtained after the process is stored in the store buffer 70.

Prior to the data process performed by the data determination unit 30, the data deletion unit 40, the data processor 50, and the cache controller 60, the data analyzer 80 performs an analysis of each line of the image data.

The data analyzer 80 analyzes the image data that has been divided into plural regions to thereby determine a block size for each region to be applied as the unit of processing in the data process (for example, the cache process described with reference to FIGS. 2A and 2B) on the region. The data analyzer 80 analyzes plural pieces of pixel data in each line to thereby select a block size to be applied to the line from among plural block sizes.

Figure 3:
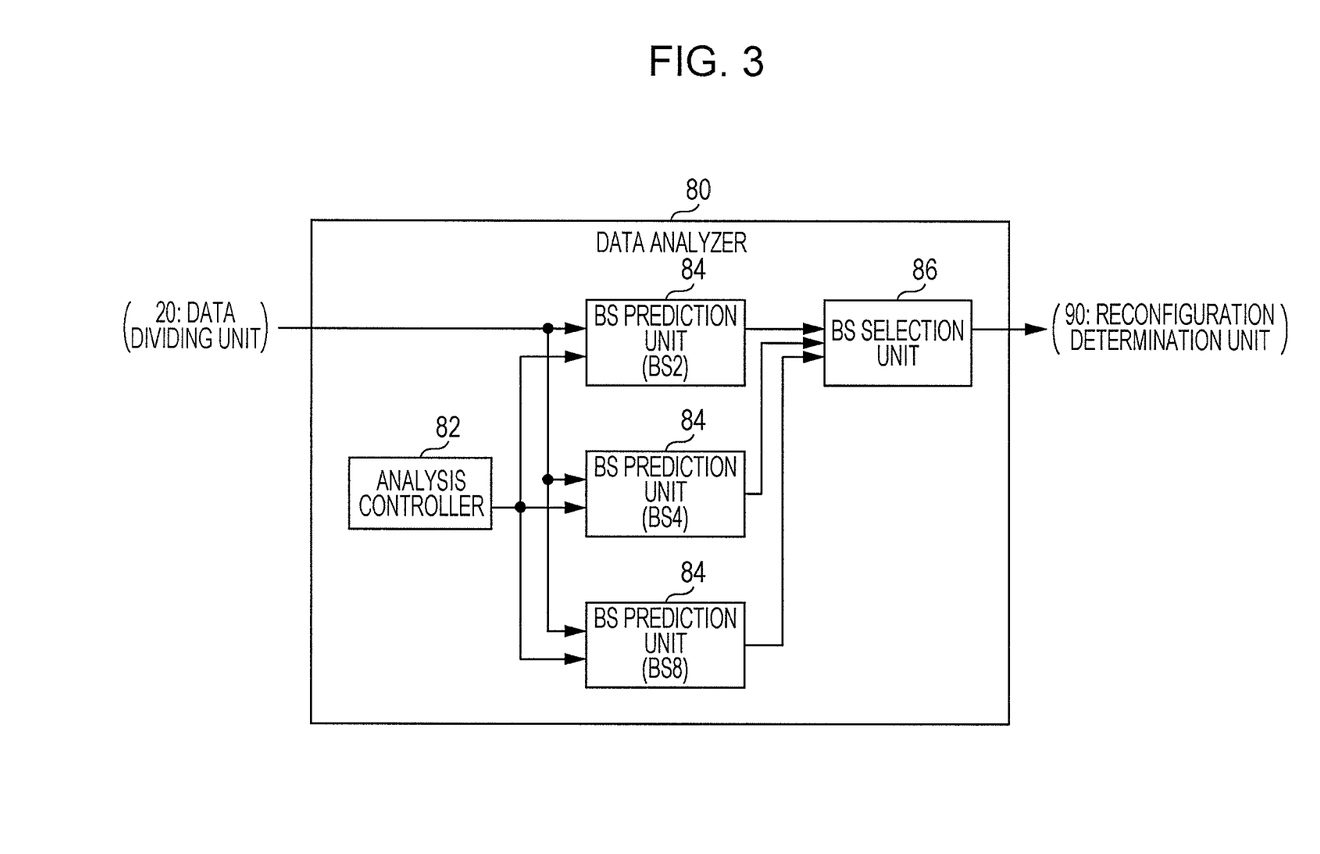
FIG. 3 is a diagram illustrating a specific example of a data analyzer.

FIG. 3 is a diagram illustrating a specific example of the data analyzer 80. In the specific example in FIG. 3, the data analyzer 80 includes an analysis controller 82, plural BS prediction units 84 that correspond to plural block sizes (BSs), and a block size (BS) selection unit 86.

The image data that has been divided into plural lines by the data dividing unit 20 is sent to the plural BS prediction units 84 on a line-by-line basis. In the specific example illustrated in FIG. 3, the data analyzer 80 includes three BS prediction units 84 that correspond to the block sizes 2, 4, and 8 (BS2, BS4, and BS8), respectively. Each BS prediction unit 84 counts the number of hits and the number of misses in a case of applying the corresponding block size to each line, and further counts the number of switches between the hit state and the miss state.

Figure 4:
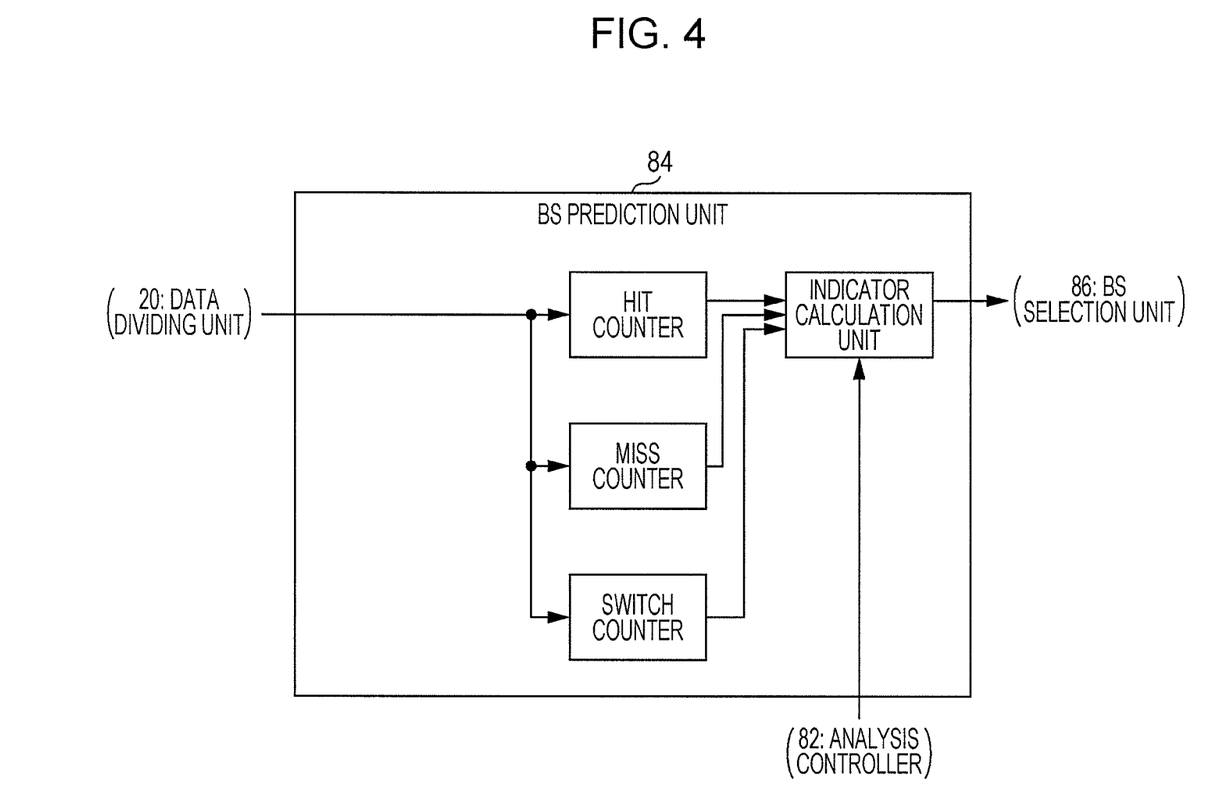
FIG. 4 is a diagram illustrating a specific example of a block size (BS) prediction unit.

FIG. 4 is a diagram illustrating a specific example of the BS prediction unit 84. Each of the three BS prediction units 84 in FIG. 3 has a configuration illustrated in FIG. 4.

The BS prediction unit 84 has a hit counter that counts the number of hits, a miss counter that counts the number of misses, and a switch counter that counts the number of switches between the hit state and the miss state when the corresponding block size is applied to each line.

For example, the BS prediction unit 84 for the block size 2 (BS2) counts the number of hits, the number of misses, and the number of switches when the block size 2 is applied, for plural pieces of pixel data obtained from the data dividing unit 20 on a line-by-line basis. That is, for each block constituted by two pieces of pixel data, the pieces of pixel data in the block are checked. If all pieces of pixel data in the block are the same, the number of hits is incremented by the hit counter. If at least one piece of pixel data is different from the others in the block, the number of misses is incremented by the miss counter. Determination as to whether each block is a hit or a miss is performed at the position of the block from one to the next in each line. In a case where the state changes from a hit to a miss or from a miss to a hit at a position between adjacent blocks, the number of switches is incremented by the switch counter.

Similarly, the BS prediction unit 84 for the block size 4 (BS4) counts the number of hits, the number of misses, and the number of switches when the block size 4, which represents a block being constituted by four pieces of pixel data, is applied, for plural pieces of pixel data obtained from the data dividing unit 20 on a line-by-line basis. The BS prediction unit 84 for the block size 8 (BS8) counts the number of hits, the number of misses, and the number of switches when the block size 8, which represents a block being constituted by eight pieces of pixel data, is applied, for plural pieces of pixel data obtained from the data dividing unit 20 on a line-by-line basis.

The BS prediction unit 84 further includes an indicator calculation unit that calculates an indicator concerning the predicted performance. The indicator calculation unit calculates an indicator $Pfn$ (n is the block size) concerning the predicted performance as expressed by expression (1) below, for example, on the basis of the count values obtained from the counters and circuit management data obtained from the analysis controller 82.

$$Pfn(\text{clocks}) = \text{Hit block processing time} + \text{Miss block processing time} + \text{Reconfiguration time} + \text{Loading time} + \text{Other time} \quad (1)$$

Hit block processing time = The number of hits×1 clock

Miss block processing time = The number of misses×n clocks

Reconfiguration time = Circuit configuration time + Pipeline data purge time

Loading time=Time taken to load reconfiguration
data into the reconfiguration memory 110

For example, the BS prediction unit 84 for the block size 2 (BS2) calculates predicted performance Pf2 concerning the block size 2, the BS prediction unit 84 for the block size 4 (BS4) calculates predicted performance Pf4 concerning the block size 4, and the BS prediction unit 84 for the block size 8 (BS8) calculates predicted performance Pf8 concerning the block size 8.

Referring back to FIG. 3, the BS selection unit 86 compares plural values of the predicted performance Pfn obtained from the plural BS prediction units 84 for each line to thereby determine a block size to be applied to the line. The BS selection unit 86 selects a block size that satisfies a selection condition on the processing time from among plural block sizes. For example, the BS selection unit 86 selects a block size with which a process is performed at a highest speed, that is, a block size corresponding to Pfn of the smallest number of clocks among the predicted performance Pf2 concerning the block size 2, the predicted performance Pf4 concerning the block size 4, and the predicted performance Pf8 concerning the block size 8.

The BS selection unit 86 selects, for each line among plural lines, a block size to be applied to the line, and outputs the result of selection to a reconfiguration determination unit 90.

Referring back to FIG. 1, the reconfiguration determination unit 90 requests the reconfiguration controller 200 to perform reconfiguration in a case where the circuit configuration in the reconfigurable circuit 100 needs to be reconfigured in the data process (for example, the cache process described with reference to FIGS. 2A and 2B) on the image data.

The image data is divided into plural lines by the data dividing unit 20, and the data process is performed on each line. In the data process, for each line, a block size selected for the line is applied.

Regarding the circuit configuration in the reconfigurable circuit 100 illustrated in FIG. 1, the circuit configuration relating to the data determination unit 30, the data deletion unit 40, and the cache controller 60 is reconfigured, for example. That is, the circuit configuration in the reconfigurable circuit 100 is partially reconfigured.

For example, in a case where the block size 2 is applied to the data process, a circuit configuration (relating to the data determination unit 30, the data deletion unit 40, and the cache controller 60) corresponding to the block size 2 is reconfigured in the reconfigurable circuit 100 on the basis of the reconfiguration data BS2 in the reconfiguration memory 110.

Similarly, in a case where the block size 4 is applied, a circuit configuration corresponding to the block size 4 is reconfigured on the basis of the reconfiguration data BS4 in the reconfiguration memory 110. In a case where the block size 8 is applied, a circuit configuration corresponding to the block size 8 is reconfigured on the basis of the reconfiguration data BS8 in the reconfiguration memory 110.

In the data process for each line, in a case where a circuit configuration corresponding to a block size to be applied to the line is not configured in the reconfigurable circuit 100, the reconfiguration determination unit 90 outputs an interruption signal that requests reconfiguration to the reconfiguration controller 200. That is, while the data process is in progress for each line among plural lines, in a case where a block size different from the block size applied to the current line on which the data process is being performed is to be applied to the succeeding line, an interruption signal is output from the reconfiguration determination unit 90.

When the reconfiguration controller 200 has received the interruption signal from the reconfiguration determination unit 90, the reconfiguration controller 200 reconfigures a circuit configuration corresponding to the block size selected by the data analyzer 80 in the reconfigurable circuit 100.

Figure 5:
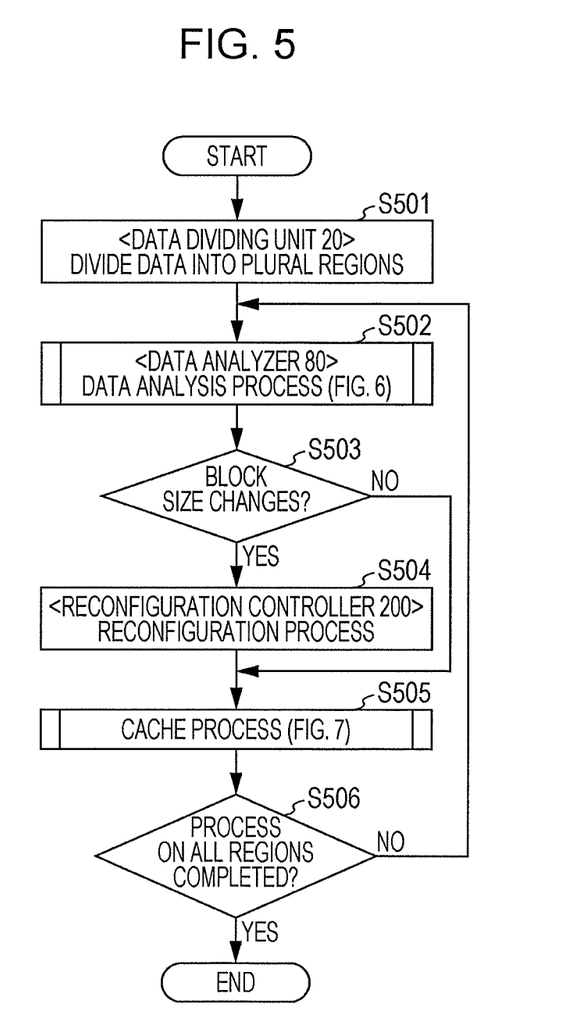
FIG. 5 is a flowchart illustrating a process performed by the data processing apparatus in FIG. 1.

FIG. 5 is a flowchart illustrating a process performed by the data processing apparatus in FIG. 1. Description of the flowchart in FIG. 5 will be given while using reference numerals in FIG. 1 for the constituent elements (units) illustrated in FIG. 1.

The data dividing unit 20 divides image data obtained from the load buffer 10 into plural image regions (step S501). The data dividing unit 20 assumes one line to be one image region, for example, and divides the image data into plural lines.

Prior to a data process, an analysis process is performed on each line of the image data by the data analyzer 80. The data analyzer 80 analyzes plural pieces of pixel data for each line to thereby select a block size to be applied to the line from among plural block sizes (step S502).

Figure 6:
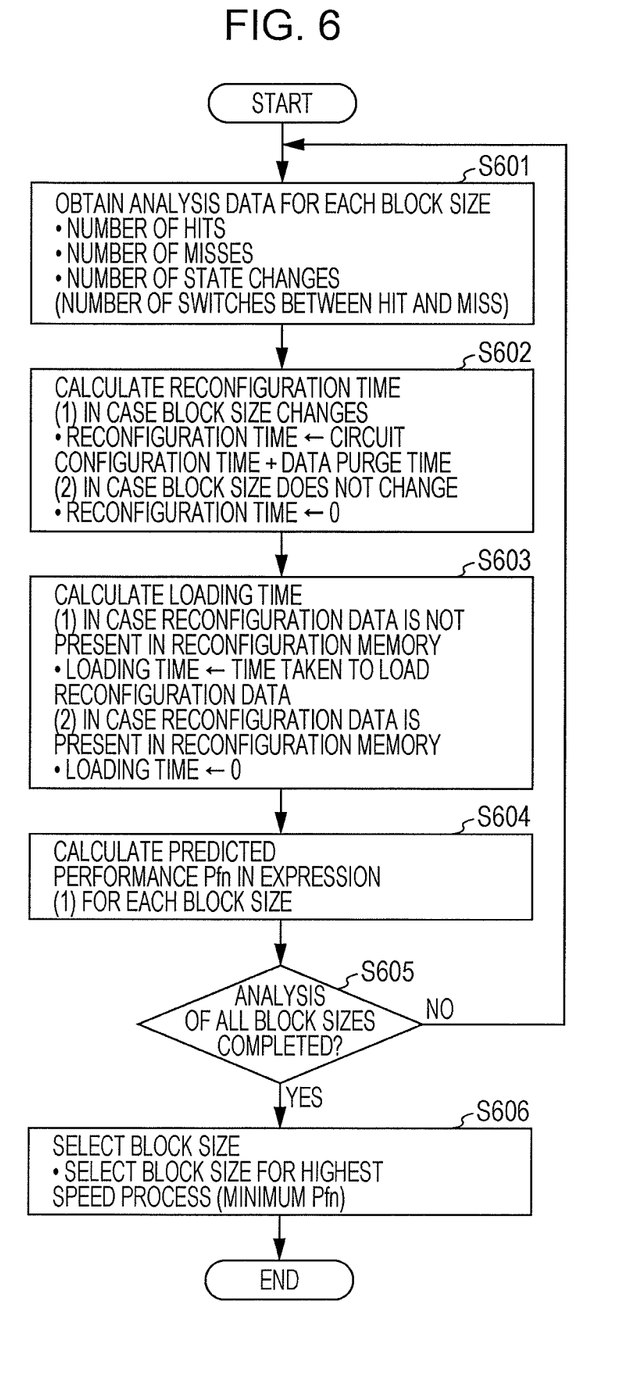
FIG. 6 is a flowchart illustrating an analysis process performed on image data.

FIG. 6 is a flowchart illustrating the analysis process performed on image data. The data analyzer 80 performs the analysis process illustrated in FIG. 6 for each line, and selects a block size to be applied to the line.

First, the data analyzer 80 counts the number of hits, the number of misses, and the number of switches for each block size among plural block sizes when the block size is applied to the current line that is a target of analysis (step S601). For example, for each of the block sizes 2, 4, and 8, the number of hits and the number of misses are counted, and furthermore, the number of switches between the hit state and the miss state is counted (see FIG. 4).

Next, the data analyzer 80 calculates, for each block size, a reconfiguration time taken when the block size is applied to the current line (step S602). A method of calculating the reconfiguration time differs (1) in a case where the block size changes and (2) in a case where the block size does not change.

For a block size the same as that applied to a line (preceding line) immediately before the current line, that is, in a case where the block size does not change, a circuit configuration corresponding to the block size applied to the preceding line is also able to be used for the current line, and therefore, reconfiguration is not needed and the reconfiguration time is zero.

On the other hand, for a block size different from that applied to the preceding line, that is, in a case where the block size changes, reconfiguration from the circuit configuration corresponding to the block size applied to the preceding line to a circuit configuration corresponding to the block size to be applied to the current line needs to be performed. Accordingly, the reconfiguration time is the sum of a circuit configuration time and a data purge time. Note that the circuit configuration time is the time that is assumed to be taken to reconfigure, in the reconfigurable circuit 100, a circuit corresponding to the reconfiguration data, and the data purge time is the time that is assumed to be taken until data is completely erased from the circuit configuration in the image process on the preceding line before the reconfiguration.

Next, the data analyzer 80 calculates, for each block size, a loading time taken when the block size is applied to the current line (step S603). A method of calculating the loading time differs (1) in a case where reconfiguration data corresponding to the block size is not present in the reconfiguration memory 110 and (2) in a case where reconfiguration data corresponding to the block size is present in the reconfiguration memory 110.

For a block size for which reconfiguration data is present in the reconfiguration memory 110, loading of the reconfiguration data into the reconfiguration memory 110 is not needed, and therefore, the loading time is zero. On the other hand, for a block size for which reconfiguration data is not present in the reconfiguration memory 110, loading of the reconfiguration data from the DRAM 120 into the reconfiguration memory 110 is needed. The time taken to perform the loading is the loading time.

The data analyzer 80 calculates the indicator Pfn (expression (1)) concerning the predicted performance for each block size (step S604). The process from step S601 to step S604 is performed for each block size, and is repeated until the analysis of all block sizes is completed (step S605).

When the analysis of all block sizes is completed, the data analyzer 80 compares plural values of the predicted performance Pfn for all block sizes to thereby select a block size to be applied to the current line (step S606). For example, a block size with which the process is performed at a highest speed, that is, a block size corresponding to Pfn of the smallest number of clocks, is selected.

Referring back to FIG. 5, when a block size to be applied to the current line has been selected by the data analyzer 80 (step S502), the reconfiguration determination unit 90 determines whether or not the block size changes when proceeding to the current line from the preceding line (step S503). That is, it is determined whether or not the block size applied to the preceding line and the block size to be applied to the current line differ from each other.

If the block size changes, the reconfiguration controller 200 reconfigures a circuit configuration corresponding to the block size to be applied to the current line in the reconfigurable circuit 100 (step S504). On the other hand, if the block size does not change, reconfiguration is not performed, and the circuit configuration corresponding to the block size applied to the preceding line is maintained in the reconfigurable circuit 100.

The data determination unit 30, the data deletion unit 40, the data processor 50, and the cache controller 60 perform the data process (for example, the cache process described with reference to FIGS. 2A and 2B) on the image data of the current line (step S505).

Figure 7:
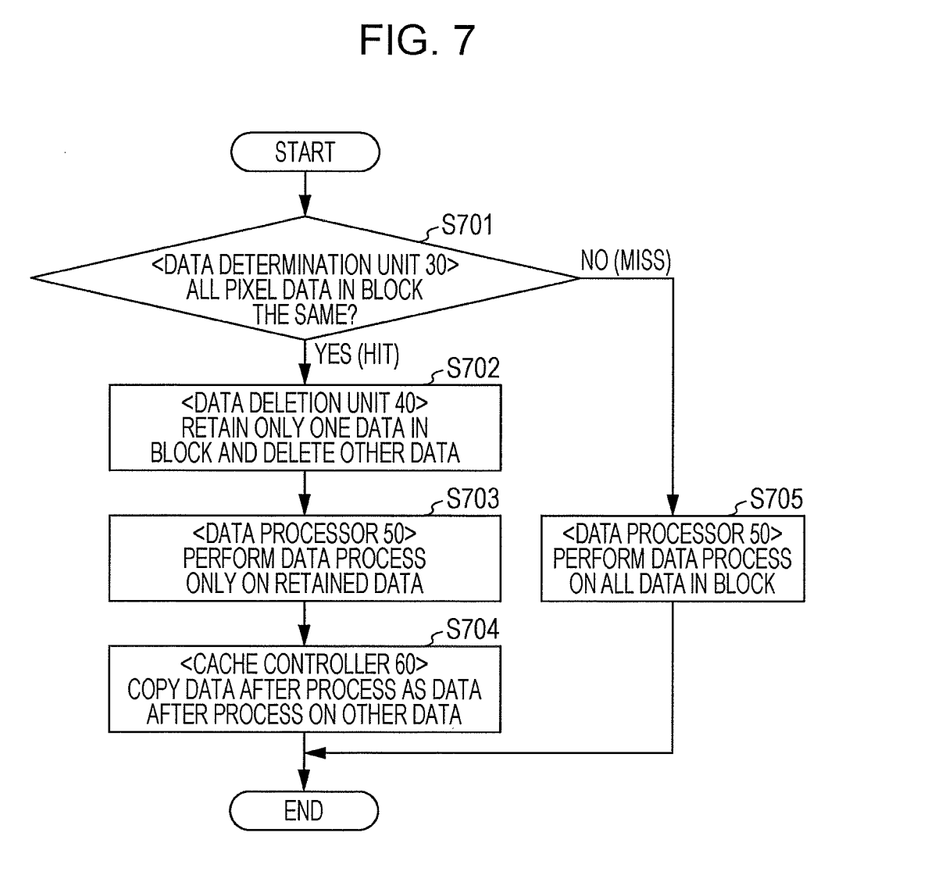
FIG. 7 is a flowchart illustrating a cache process performed on image data.

FIG. 7 is a flowchart illustrating a cache process performed on image data. For each line in the image data, plural pieces of pixel data that belong to the line are put together into a block having a block size selected for the line, and the cache process illustrated in FIG. 7 is performed for each block.

First, the data determination unit 30 checks all pieces of pixel data in the block, and determines whether or not all pieces of pixel data in the block are the same (step S701). If all pieces of pixel data in the block are the same, it is determined that the block is in the hit state. If at least one piece of pixel data among all pieces of pixel data in the block is different from the others in the block, it is determined that the block is in the miss state.

If the block is in the hit state, the data deletion unit 40 retains one piece of pixel data among the pieces of pixel data, that is, the first piece of pixel data, for example, in the block, and deletes the other pieces of pixel data (step S702).

The data processor 50 performs the data process, that is, the image process such as a color conversion process or a filter process, for example, on the piece of pixel data that is retained without being deleted (step S703, see FIG. 2A). The cache controller 60 copies the result of the process on the one piece of pixel data in the block, and obtains the results of the process on the other pieces of pixel data (step S704, see FIG. 2A).

On the other hand, if the block is in the miss state, the data processor 50 performs the data process, that is, the image process such as a color conversion process or a filter process, for example, on every piece of pixel data in the block (step S705).

Referring back to FIG. 5, when the cache process on the current line is completed (step S505), it is checked whether or not the process on all regions in the image data, that is, on all lines, is completed (step S506). The process from step S502 to step S505 is repeated until the process on all lines is completed. When the process on all lines is completed, the flow in FIG. 5 ends.

While image data is divided into plural lines in the above-described specific example, some modifications are possible in division of image data.

Figure 8A:
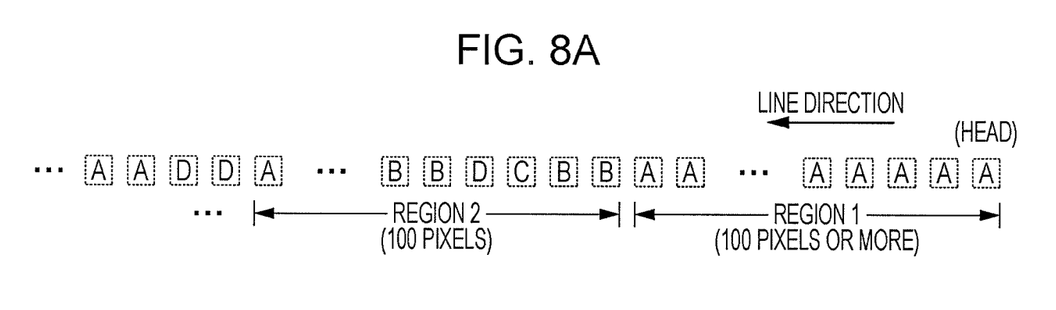
FIGS. 8A and 8B are diagrams for describing modifications relating to division of image data.
Figure 8B:
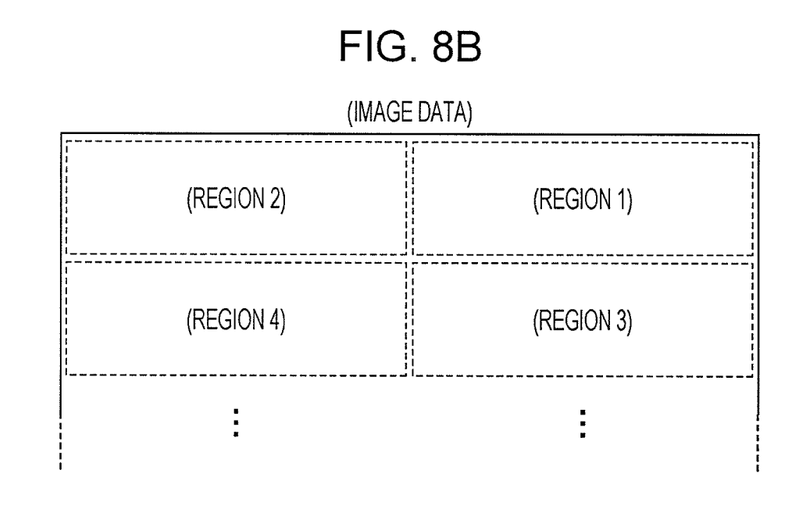

FIGS. 8A and 8B are diagrams for describing modifications relating to division of image data. FIG. 8A illustrates a specific example of division based on variable regions. In the specific example in FIG. 8A, plural pieces of pixel data for which the hit state continues is assumed to be one region. That is, in FIG. 8A, plural successive pieces of pixel data A starting from the head of the line constitute a region 1.

However, in order for a region not to become too small, it is desired to set the minimum number of pixels used in division. In the specific example in FIG. 8A, the minimum number of pixels used in division is assumed to be 100 pixels. Accordingly, even in a case where the hit state does not continue, a region 2 is constituted by a set of 100 pixels.

According to the division based on variable regions in FIG. 8A, plural pieces of pixel data for which the hit state continues are put together into one region, and the hit state continues even if the maximum block size is applied to the region, for example. As a result, the performance of the cache process on the region substantially increases. As a matter of course, for a region in which the hit state does not continue, a block size corresponding to the region is selected on the basis of the result of the analysis of pieces of pixel data in the region.

FIG. 8B illustrates a specific example of division based on two-dimensional regions. For example, as illustrated in FIG. 8B, image data may be divided into plural two-dimensional regions 1, 2, 3, 4, and so on. Note that, in a case where a region is a two-dimensional region, each block may have a two-dimensional shape.

Figure 9:
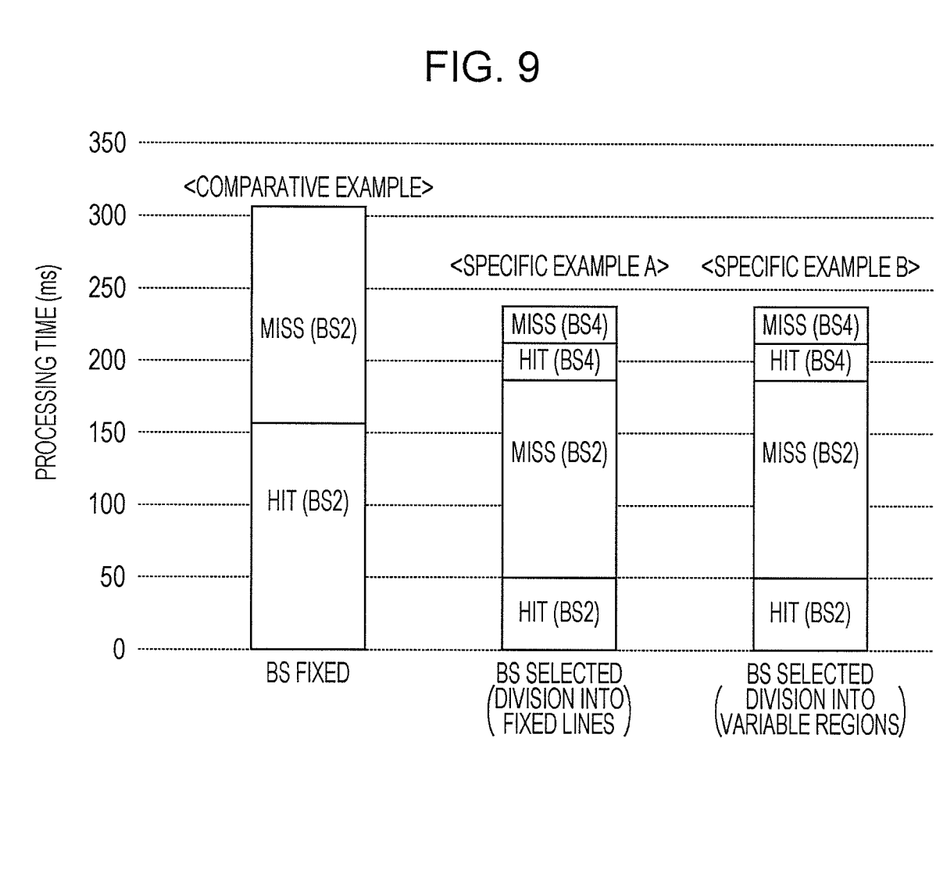
FIG. 9 is a diagram illustrating the results of a simulation relating to the processing time of image data.

FIG. 9 is a diagram illustrating the results of a simulation relating to the processing time of image data. In FIG. 9, for specific examples A and B according to the exemplary embodiments of the present invention and for a comparative example, the results obtained when the same image process is performed on the same image data are illustrated.

The specific example A represents the processing time of the image process performed on the entire image data in a case where the image data is divided into plural lines and a block size (BS2 or BS4) is selected for each line.

The specific example B represents the processing time of the image process performed on the entire image data in a case where the image data is divided on the basis of variable regions (see FIG. 8A) and a block size (BS2 or BS4) is selected for each variable region.

On the other hand, the comparative example represents the result obtained when the block size is fixed to 2 (BS2) and the image process is performed on the entire image data.

In both of the specific examples A and B according to the exemplary embodiments of the present invention, the process is accelerated approximately 1.3 times the comparative example (the processing time decreases). That is, the performance of the image process may increase by selecting a block size for each region.

Note that, in the simulation results in FIG. 9, there is no noticeable difference between the specific example A in which a region is fixed to one line and the specific example B in which a region is made variable. Depending on the state of the image data, such as the arrangement of pixels, for example, it is expected that the performance may notably increase by making regions variable.

While exemplary embodiments of the present invention have been described, the above-described exemplary embodiments are merely illustrative in all respects and are not intended to limit the scope of the present invention. The present invention includes various modifications without departing from the spirit thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
    an analyzer that analyzes data in a plurality of regions of target data to thereby determine, for each region, a block size to be applied as a unit of processing of data in the region; and
    a controller that configures, for each region, a circuit corresponding to the block size to be applied to the region, in a reconfigurable circuit in a case of processing the data in the plurality of regions of the target data, wherein
    the analyzer analyzes data for each region to thereby derive indicators predicted for a data process that is performed by using each of a plurality of block sizes as the unit of processing, compare the indicators, and select a block size to be applied to the region from among the plurality of block sizes, and
    the analyzer derives, for each region, the indicators each reflecting a processing time predicted for the data process that is performed by using each of the plurality of block sizes as the unit of processing, and selects a block size that satisfies a selection condition on the processing time from among the plurality of block sizes.

2. The data processing apparatus according to claim 1, wherein
    the analyzer derives, for each block size among the plurality of block sizes, the indicators each including a reconfiguration time taken to configure a circuit corresponding to the block size in the reconfigurable circuit and a data processing time taken to perform a data process using the circuit corresponding to the block size.

3. The data processing apparatus according to claim 1, wherein
    the analyzer analyzes pixel data in a plurality of regions of image data to thereby select, for each region, a block size to be applied to the region from among a plurality of block sizes that correspond to different numbers of pixels, and
    the controller configures, for each region, a circuit corresponding to the block size to be applied to the region, in the reconfigurable circuit in a case of processing the pixel data in the plurality of regions of the image data.

4. The data processing apparatus according to claim 2, wherein
    the analyzer analyzes pixel data in a plurality of regions of image data to thereby select, for each region, a block size to be applied to the region from among a plurality of block sizes that correspond to different numbers of pixels, and
    the controller configures, for each region, a circuit corresponding to the block size to be applied to the region, in the reconfigurable circuit in a case of processing the pixel data in the plurality of regions of the image data.

5. A data processing apparatus comprising:
    an analyzer that analyzes data in a plurality of regions of target data to thereby determine, for each region, a block size to be applied as a unit of processing of data in the region; and
    a controller that configures, for each region, a circuit corresponding to the block size to be applied to the region, in a reconfigurable circuit in a case of processing the data in the plurality of regions of the target data, wherein
    the analyzer analyzes data for each region to thereby derive indicators predicted for a data process that is performed by using each of a plurality of block sizes as the unit of processing, compare the indicators, and select a block site to he applied to the region from among the plurality of block sizes, and
    the analyzer derives, for each block size among the plurality of block sizes, the indicators each including a reconfiguration time taken to configure a circuit corresponding to the block size in the reconfigurable circuit and a data processing time taken to perform a data process using the circuit corresponding to the block size.

6. The data processing apparatus according to claim 5, wherein
    the analyzer analyzes pixel data in a plurality of regions of image data to thereby select, for each region, a block size to be applied to the region from among a plurality of block sizes that correspond to different numbers of pixels, and
    the controller configures, for each region, a circuit corresponding to the block size to be applied to the region, in the reconfigurable circuit in a case of processing the pixel data in the plurality of regions of the image data.

7. A data processing method comprising:
    analyzing data in a plurality of regions of target data to thereby determine, for each region, a block size to be applied as a unit of processing of data in the region,
    the analyzing of data including analyzing data for each region to thereby derive indicators predicted for a data process that is performed by using each of a plurality of block sizes as the unit of processing, comparing the indicators, and selecting a block size to be applied to the region from among the plurality of block sizes,
    the indicators, derived for each region, each reflecting a processing time predicted for the data process that is performed by using each of the plurality of block sizes as the unit of processing, and a block size being selected that satisfies a selection condition on the processing time from among the plurality of block sizes; and configuring, for each region, a circuit corresponding to the block size to be applied to the region, in a reconfigurable circuit in a case of processing the data in the plurality of regions of the target data.

8. A non-transitory computer readable medium storing a program causing a computer to execute a process for data processing, the process comprising:

analyzing data in a plurality of regions of target data to thereby determine, for each region, a block size to be applied as a unit of processing of data in the region, the analyzing of data including analyzing data for each region to thereby derive indicators predicted for a data process that is performed by using each of a plurality of block sizes as the unit of processing, comparing the indicators, and selecting a block size to be applied to the region from among the plurality of block sizes, the indicators, derived for each region, each reflecting a processing time predicted for the data process that is performed by using each of the plurality of block sizes as the unit of processing, and a block size being selected that satisfies a selection condition on the processing time from among the plurality of block sizes; and configuring, for each region, a circuit corresponding to the block size to be applied to the region, in a reconfigurable circuit in a case of processing the data in the plurality of regions of the target data.

\* \* \* \* \*